(12) United States Patent
Shen

(10) Patent No.: US 9,843,796 B2
(45) Date of Patent: Dec. 12, 2017

(54) CAMERA TESTING USING VIRTUAL IMAGES

(71) Applicant: Facebook, Inc., Menlo Park, CA (US)

(72) Inventor: Shizhe Shen, San Mateo, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/263,250

(22) Filed: Sep. 12, 2016

(65) Prior Publication Data

US 2016/0381355 A1   Dec. 29, 2016

Related U.S. Application Data

(62) Division of application No. 14/566,634, filed on Dec. 10, 2014, now Pat. No. 9,445,086.

(51) Int. Cl.
| | |
|---|---|
| H04N 17/00 | (2006.01) |
| G03B 15/03 | (2006.01) |
| G06T 7/00 | (2017.01) |
| H04N 5/225 | (2006.01) |

(52) U.S. Cl.
CPC ........ H04N 17/002 (2013.01); G03B 15/03 (2013.01); G06T 7/0002 (2013.01); H04N 5/2254 (2013.01); H04N 5/2257 (2013.01); *G06T 2207/10148* (2013.01)

(58) Field of Classification Search
CPC ........ H04N 17/00; H04N 17/002; H04N 7/18; H04N 7/183; H04N 5/23229
USPC ... 348/187, 188, 181, 175, 48, 47, 135, 139, 348/222.1, 223.1, 234, 370
See application file for complete search history.

(56) References Cited

U.S. PATENT DOCUMENTS

| | | | |
|---|---|---|---|
| 5,383,099 A * | 1/1995 | Peters | G03B 15/06 362/18 |
| 6,057,882 A | 5/2000 | Van den Branden Lambrecht et al. | |
| 7,075,661 B2 * | 7/2006 | Petty | G01S 17/875 356/603 |
| 7,936,392 B2 * | 5/2011 | Ng | G02B 3/0056 348/349 |
| 8,059,165 B2 * | 11/2011 | Ishii | H04N 9/735 348/222.1 |
| 8,675,076 B2 | 3/2014 | Varga et al. | |
| 8,866,912 B2 | 10/2014 | Mullins | |
| 9,323,133 B1 * | 4/2016 | Matriano | G03B 17/53 |
| 9,456,141 B2 * | 9/2016 | Fishman | H04N 5/23293 |
| 2014/0240491 A1 * | 8/2014 | Kauniskangas | H04N 17/002 348/135 |
| 2014/0247340 A1 | 9/2014 | Kauniskangas et al. | |

(Continued)

OTHER PUBLICATIONS

HyVision System Inc., Vision Technology Pioneer, Company Profile, Feb. 13, 2013, 13 pgs.

(Continued)

*Primary Examiner* — Trang U Tran
(74) *Attorney, Agent, or Firm* — Morgan, Lewis & Bockius LLP

(57) ABSTRACT

An apparatus includes a virtual image generation device, a receptacle for a digital camera, and a light booth. The virtual image generation device is configured to generate a plurality of test images within the light booth in accordance with a test sequence. The receptacle is configured to enable detection of the test images by the digital camera.

5 Claims, 8 Drawing Sheets

(56) References Cited

U.S. PATENT DOCUMENTS

2015/0049390 A1* 2/2015 Lanman ............. G02B 27/0075
 359/622
2016/0080737 A1 3/2016 Tezaur

OTHER PUBLICATIONS

Shen, Notice of Allowance, U.S. Appl. No. 14/566,634, dated May 18, 2016, 18 pgs.

* cited by examiner

CAMERA TESTING USING VIRTUAL IMAGES

RELATED APPLICATIONS

This application is a divisional of U.S. application Ser. No. 14/566,634, filed Dec. 10, 2014, which is incorporated by reference herein in its entirety.

TECHNICAL FIELD

This relates generally to manufacture and testing of image capture devices, including but not limited to testing of image capture devices using virtual images.

BACKGROUND

Digital cameras, in all their forms, have proliferated greatly since their earliest days, led by the popularity of standalone digital cameras for replacing traditional film cameras and the integration of digital cameras with smartphones and other portable devices. To keep up with such proliferation, manufacturing and testing of digital cameras, camera modules, and camera sensors needs to be efficient with respect to speed and cost.

A traditional camera testing system typically includes a structure, which includes a light booth, a receptacle or opening where the lens of the camera module can be directed toward the light booth, and test charts for testing different aspects or characteristics of the camera. The charts are printed or laid on physical objects, such as plates. Within the light booth, multiple test charts may be mounted at various distances from the camera module under test. Alternatively, there is a movable platform within the light booth onto which a chart is loaded, and the platform can move in order to move the chart closer or farther away from the camera module under test. The use of physically mounted test charts requires a relatively large structure, which takes up valuable factory floor space. As a result, such a structure is inefficient with respect to cost and space. Reclaiming some of that space would be both more cost-effective and space-effective, and may even be speed-effective as well.

SUMMARY

Accordingly, there is a need for methods, systems, and apparatuses with faster, more efficient methods and interfaces for testing image capture devices. Such methods and interfaces optionally complement or replace conventional methods for testing image capture devices.

In accordance with some embodiments, a method is performed at a system with a virtual image generation device. The method includes: receiving an image capture device; generating, using the virtual image generation device, a plurality of test images in accordance with a test sequence, where each test image corresponds to a respective focal distance with respect to the image capture device; obtaining test data corresponding to respective captures of the test images by the image capture device; and providing the test data In accordance with some embodiments, a system includes a virtual image generation device, one or more processors, memory, and one or more programs; the one or more programs are stored in the memory and configured to be executed by the one or more processors and the one or more programs include instructions for performing the operations of any of the methods described above. In accordance with some embodiments, a computer readable storage medium has stored therein instructions which, when executed by a system with a virtual image generation device and one or more processors, cause the device to perform the operations of any of the methods described above.

In accordance with some embodiments, an apparatus includes a virtual image generation device, a receptacle for an image capture device, and a light booth. The virtual image generation device is configured to generate a plurality of test images within the light booth in accordance with a test sequence. The receptacle is configured to enable detection of the test images by the image capture device.

Thus, testing systems and apparatus are provided with faster, more efficient methods for testing image capture devices, thereby increasing the effectiveness, efficiency, and satisfaction with such systems. Such methods may complement or replace conventional methods for testing image capture devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
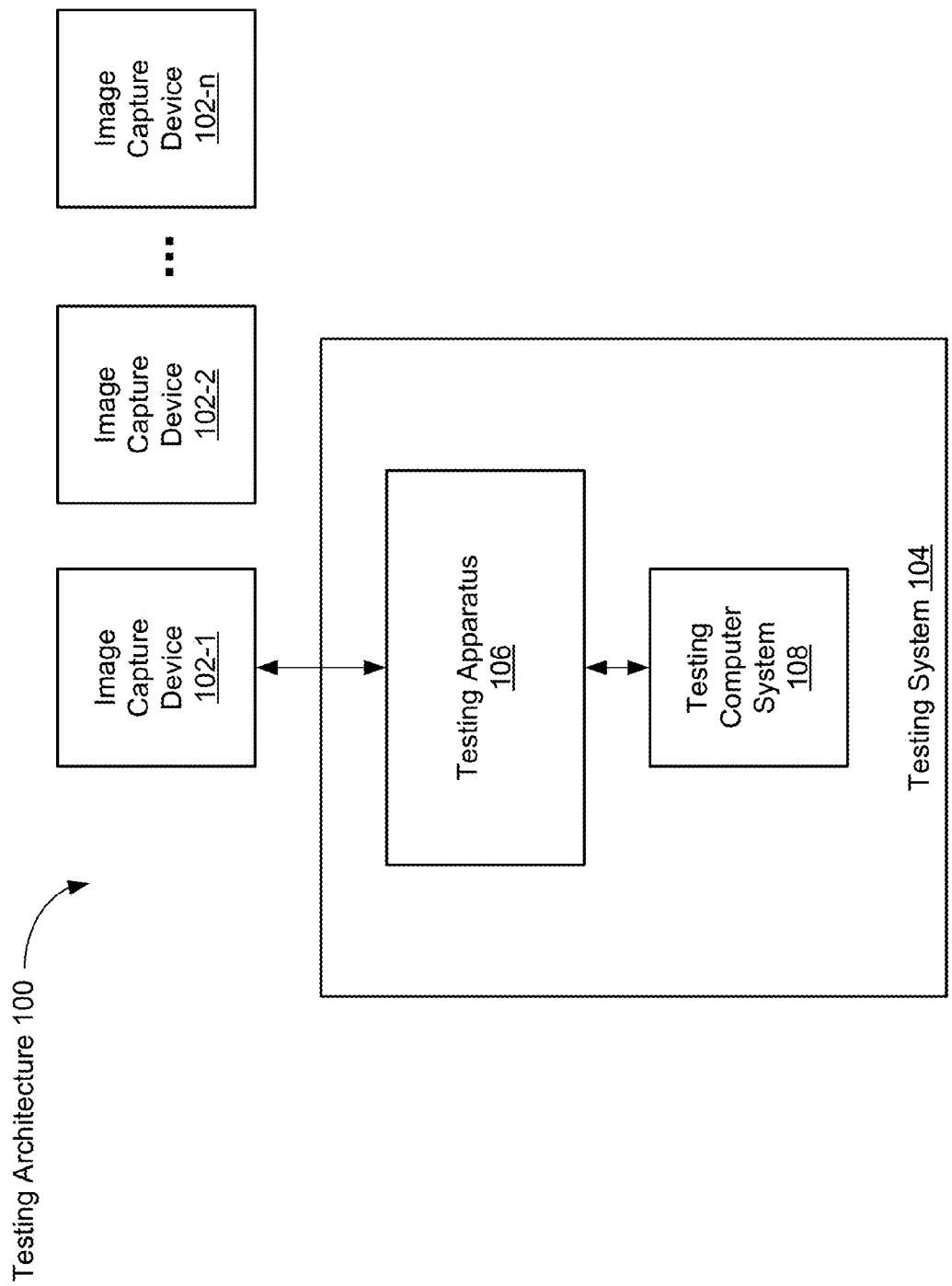
FIG. 1 is a block diagram illustrating an exemplary testing architecture for testing image capture devices in accordance with some embodiments.

Image capture devices, such as sensor modules and devices with sensor modules installed, are tested during the manufacturing process to ensure that they function at or above minimum standards. Traditional testing apparatuses include physical charts that are mounted within a light booth at various distances or can be moved up and down within the light booth. These traditional testing apparatus take up valuable factory floor space, and are inefficient due to at least the loading and unloading of physical charts. The embodiments described below improve on testing apparatus. The embodiments below include testing systems with a testing apparatus that generates virtual images as test images. The virtual image generation device may include a light field device and/or a microlens array. Without the need for physical charts, the testing system takes up less floor space and is more efficient.

Below, FIGS. 1-5 provide descriptions of an architecture for testing image capture devices and systems and apparatuses associated with the architecture. FIG. 6 is a flow diagram illustrating a method of testing image capture device. The flow diagram in FIG. 6 is used to illustrate processes performed in the architecture illustrated in FIGS. 1-5.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first image could be termed a second image, and, similarly, a second image could be termed a first image, without departing from the scope of the various described embodiments. The first image and the second image are both images, but they are not the same image.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

FIG. 1 is a block diagram illustrating a testing architecture in accordance with some embodiments. The testing architecture 100 includes a testing system 104 configured to test any number of image capture devices (e.g., camera device) 102. In some embodiments, the testing system 104 tests the image capture devices 102 one at a time, more than one at a time in parallel, or more than one at a time serially or in stages (e.g., device 102-1 at one stage of a testing process, another device 102-2 at the next stage in the testing process, and so on).

In some embodiments, the image capture device 102 is an image capture sensor (e.g., CMOS or CCD sensor) module with one or more lens, prior to installation to another device; or a portable device with an image capture device (e.g., a smartphone with an image capture sensor module, or a digital camera).

The testing system 104 tests an image capture device 102 by having the image capture device 102 capture a set of test images. In some embodiments, the testing system 104 includes a testing apparatus 106 and a testing computer system 108. The testing apparatus 106 receives the image capture devices 102 to be tested and performs the tests by generating the test images for the image capture devices 102 to capture. The testing computer system 108 provides test sequences and test images to the testing apparatus 106, receives and processes results from the image capture device 102 under test (e.g., captures of test images by the image capture device 102), and provides a user interface to control the testing apparatus 106 (e.g., user interface to add or modify or delete a test sequence of test images or a particular test image, to start or abort testing, to view test results and export the results in a desired format, or to view indications of pass or failure). In some embodiments, the results from the image capture device 102 are provided to the testing computer system 108 by the testing apparatus 106 (e.g., transmitted from the testing apparatus 106 to the testing computer system 108).

In some embodiments, the testing apparatus 106 and the testing computer system 108 are distinct devices or apparatus that are communicatively coupled (e.g., coupled through a wired or wireless connection). In some embodiments, the testing apparatus 106 and the testing computer system 108 are remotely located from each other (e.g., the testing apparatus 106 and the testing computer system 108 are communicatively coupled through one or more networks, such as a local area network, wide-area network, a virtual private network, the Internet, etc.). In some other embodiments, the testing apparatus 106 and the testing computer system 108 are integrated into one device or apparatus (e.g., housed by the same chassis).

The testing apparatus 106 generates a set of one or more test images. In some embodiments, the test images are generated in accordance with a test sequence (e.g. a sequence received from the testing computer system 108). In some embodiments, a respective test image has a predefined pattern or chart or image that is designed to test for one or more characteristics of an image capture device 102. For example, a test image may show a pattern that tests the alignment of the image capture device 102. As another example, another test image may show a color palette, which tests for color accuracy and/or color gamut. In some embodiments, characteristics that may be tested include focal distance, sharpness (e.g., sharpness at a particular focal distance), alignment, color accuracy, and color gamut. An image capture device 102 under test captures a test image, and the resulting captured image is analyzed (e.g., compared) against the test image to generate metrics for the image capture device 102 with respect to the characteristic being tested. In some embodiments, the analysis or comparison includes evaluating the resulting capture against one or more predefined criteria or thresholds associated with the characteristics being tested.

In some embodiments, a test sequence includes multiple test images, with one or more test images for simulating each of multiple focal distances. For example, a test sequence may have one or more test images corresponding to a first focal distance (e.g., image(s) for testing sharpness, alignment, color accuracy, etc. at the first focal distance), one or more test images corresponding to a second focal distance, and so on.

The test images generated by the testing apparatus 106 are virtual images. In some embodiments, these virtual images are images generated by projecting light rays or a light field toward the image capture device under test, as opposed to merely displaying an image on a display for the image capture device under test to capture. A device within the testing apparatus 106 generates and projects the light rays or light field toward the image capture device, and the image capture device detects the light rays or light field and perceives the light rays or light field as an image, which the image capture device captures. In some embodiments, the device generating the light rays or light field is a light field device (e.g., a light field display). In some embodiments, the device includes a microlens array. The microlens in the microlens array directs light rays or the light field toward the image capture device in a way that the image capture device perceives the light rays or light field as an image. In some embodiments, the device is a light field device with a microlens array.

In some embodiments, a light field device (e.g., a light field display) synthesizes a light field that corresponds to an image. The light field device projects multiple light rays that converge at a focus point; the light rays converging at the focus point produces the image at the focus point. An image capture device attempts to capture the image at the focus point by focusing on that point and receiving and capturing the light rays that converged at that point. A light field device may be used to project test images to an image capture device under test. The image capture device captures the test images projected by the light field device, and the image capture device is evaluated based on the captures of the test images.

In some embodiments, the testing apparatus 106 includes a light booth in which the test images are generated. The light booth is an enclosure in the testing apparatus 106 where lighting can be controlled, so that ambient light from outside has minimal effect, if any, on the testing results.

The testing apparatus 104 receives image capture devices 102 for testing. In some embodiments, the image capture devices 102 are tested one at a time; the testing apparatus 104 receives image capture devices 102 one at a time. In some embodiments, the image capture devices 102 are tested more than one at a time, in parallel or serially in stages (e.g., concurrently one device at one stage and another device at the next stage and so on). The testing apparatus 104 has one or more (depending on whether the image capture devices are tested one at a time or more than one at a time) receptacles for the image capture devices. The image capture device(s) may be placed on a receptacle or removed from the receptacle by hand or by a loading machine (e.g., a robotic arm). The receptacle includes an opening to the light booth; the lens of the image capture device is aimed into the light booth through the opening. In some embodiments, the receptacle includes a communicative connection to the testing system 104 (e.g., to the testing computer system 108). The communicative connection may be wired or wireless. For example, the receptacle may include a Universal Serial Bus (USB) connection to the testing computer system 108, through which the testing computer system 108 may transmit control signals to the image capture device under test in order to command the image capture device to capture the test images, and to obtain or receive the image captures from the image capture device under test. In some embodiments, the testing computer system 108 and the image capture device under test are communicatively coupled by wireless communication (e.g., Wi-Fi, Bluetooth), and the testing computer system 108 may transmit control signals to the image capture device under test, and obtain or receive the image captures from the image capture device under test, by wireless communication. In some other embodiments, the testing computer system 108 and the image capture device under test are communicatively coupled through the testing apparatus 106 (e.g., the testing apparatus 106 is communicatively coupled to both the testing computer system 108 and the image capture device under test; data and information are communicated to and from the image capture device under test through the testing apparatus 106).

In some embodiments, the receptacle is a surface on or in the testing apparatus 104 where a image capture device can be placed, and which includes an opening for the lens of the image capture device to "see" through. In some other embodiment, the receptacle is a tray, a well, or the like on or in the testing apparatus 104.

The testing computer system 108 provides a user interface for user interaction with the testing system 104, as well as performing operations related to the operation of the testing system 104. For example, the testing system 108 provides a user interface for users to configure the testing system 104 (including the testing apparatus 106), configure test images and test sequences, start and stop testing at the testing system 104, viewing test results, and analyzing test results (e.g., the image captures from the image capture device under test). The testing system 108 also controls the testing apparatus 106, issuing control signals to the testing apparatus 106 to generate test images in accordance with a test sequence. In some embodiments, the testing computer system 108 also issues control signals to the image capture device under test to command the image capture device to capture the test images. In some embodiments, the testing computer system 108 is a desktop computer, laptop computer, a workstation computer, or a tablet device.

In some embodiments, the testing computer system 108 analyzes the test results for an image capture device under test by comparing the images captured by and received from the image capture device under test to the corresponding test image. For example, the testing computer system 108 compares the sharpness of the image capture versus the sharpness of the original test image, the colors of the image capture versus the colors of the original test image, and so on, and determines whether the difference exceeds a respective predefined threshold. In some embodiments, the testing computer system 108 analyzes the test results for an image capture device under test by comparing the images captured by and received from the image capture device under test to predefined thresholds. For example, the testing computer system 108 compares the sharpness of the image capture to a respective predefined threshold, the colors of the image capture to a respective predefined threshold, and so on. These comparisons may be used by the testing computer system 108 to determine whether the image capture device passed or failed with respect to a test image. In some embodiments, an image capture device that passed with respect to at least a predefined amount of the test images in the test sequence is determined to have passed (e.g., passed overall, passed with respect to the test sequence); otherwise the image capture device is determined to have failed. In some embodiments, an image capture device may be determined to have passed or failed with respect to particular characteristics. For example, an image capture device may be determined to have passed, with respect to a test image or overall, with respect to sharpness but determined to have failed, with respect to the test image or overall, with respect to color accuracy.

Figure 2:
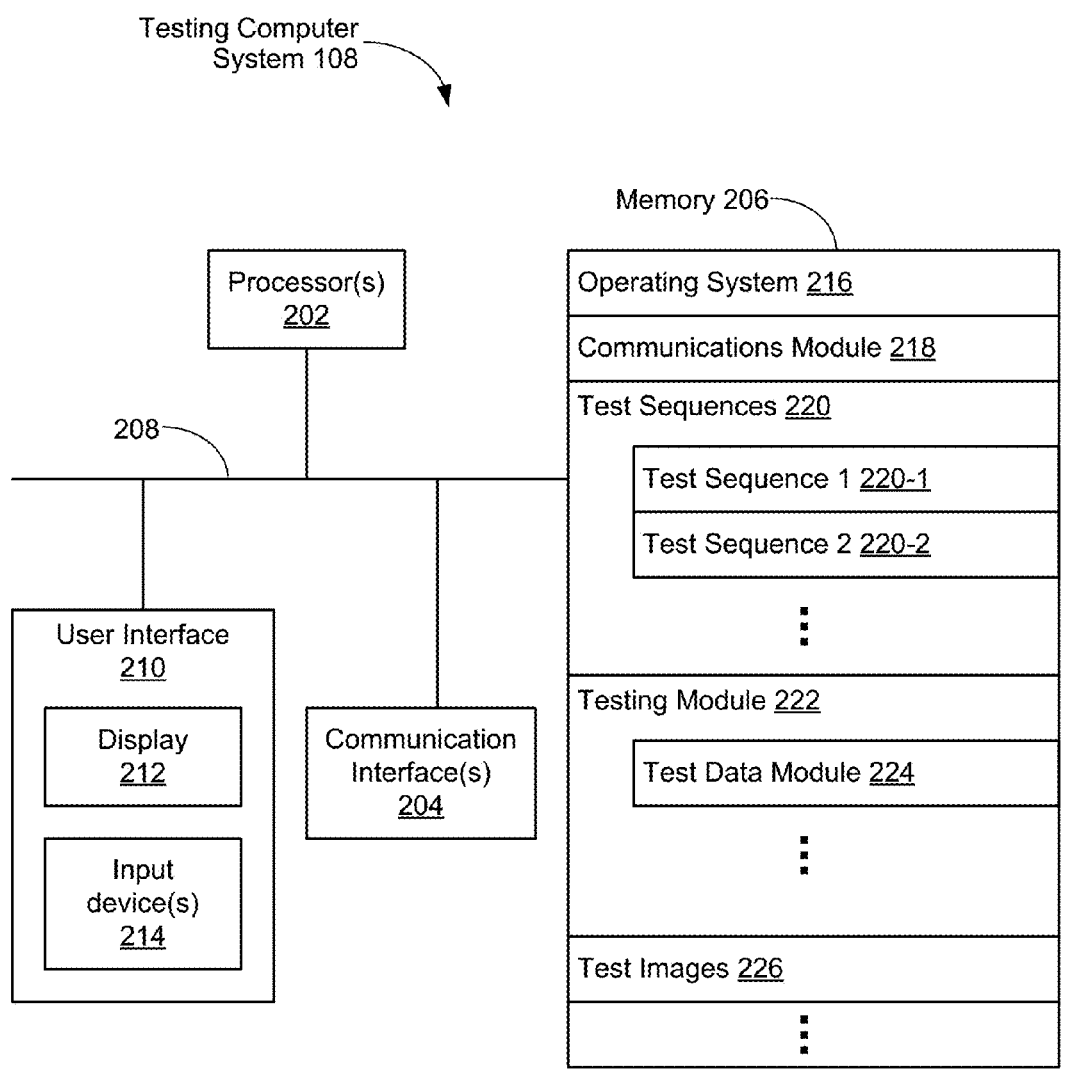
FIG. 2 is a block diagram illustrating an exemplary testing computer system in accordance with some embodiments.

FIG. 2 is a block diagram illustrating an exemplary testing computer system 108 in accordance with some embodiments. The testing computer system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The testing computer system 108 includes a user interface 210. The user interface 210 includes a display device 212 and one or more input devices 214 such as a keyboard, mouse, trackpad, and/or input buttons. Alternatively or in addition, the display device 212 includes a touch-sensitive surface, in which case the display is a touch-sensitive display.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules and data structures, or a subset or superset thereof:

- an operating system 216 that includes procedures for handling various basic system services and for performing hardware dependent tasks;
- a network communication module 218 that is used for connecting the testing computer system 108 to other computers, devices (e.g., the image capture device under test), or apparatus (e.g., the testing apparatus 106) via the one or more communication network interfaces 204 (wired or wireless) and optionally one or more communication networks, such as USB, Wi-Fi, Bluetooth, the Internet, cellular telephone networks, mobile data networks, other wide area networks, local area networks, metropolitan area networks, and so on;
- one or more test sequences 220;
- a testing module 222 for performing various operations related to the testing of image capture devices, which includes:
  - a test data module 224 for analyzing images captured by the image capture devices under test and generating test data (not shown) based on the analysis; and
- test images 226, which stores data corresponding to the possible test images that may be used for testing (e.g., data for generating the light fields or light rays corresponding to the test images, the test images themselves as image files).

Operations performed by the testing module 222 include, for example, providing a user interface, issuing control signals to the testing apparatus 106 and the image capture device under test, and receiving or obtaining image captures from the image capture device under test.

In some embodiments, the test data module 224 determines if an image capture device under test passes or fails based on the test data. The test data module 224 compares an image capture against the corresponding test image to determine if the image capture satisfies one or more test criteria (e.g., the sharpness of the image capture is off from the test image by less than a threshold amount, or the actual sharpness of the image capture is below a threshold amount). If the image capture satisfies the criteria, the test data module 224 determines that the image capture device has passed with respect to the particular test image. Otherwise, the test data module 224 determines that the image capture device has failed with respect to the particular test image. For example, if the test data indicates that the image capture device captures images at a sharpness that is below a predefined threshold, the test data module 224 indicates that the image capture device failed with respect to the corresponding test image. In some embodiments, if the image capture device is determined to have passed with respect to all or a predefined portion of the test images in the test sequence (e.g., 90% of the test images), then the image capture device is determined to have passed the test sequence. Otherwise, the image capture device is determined to have failed the test sequence. In some embodiments, the test data module 224 determines that an image capture device passes or fails, with respect to a test image or overall, with respect to a characteristic (e.g., sharpness, color accuracy, alignment)

The testing sequences 220 include, for example, a first testing sequence 220-1 and a second testing sequence 220-2. Different testing sequences may differ based on the different test images used, a different order in which the test images are used, and so on.

The testing computer system 108 uses the test images 226 data to generate control signals for the testing apparatus 106. The control signals control the testing apparatus 106 to project light rays or light fields to generate the test images. For example, the control signals instruct the testing apparatus 106 to manipulate the light ray projection and/or the microlens array in a manner that generates the test images.

In some embodiments, the testing module 222 presents test results (e.g., displays the image capture from the image capture device and/or the results of the analysis) on the display 212. When the testing module 222 determines whether the image capture device passes or fails (e.g., overall, with respect to a test image, with respect to a characteristic overall, with respect to a character with respect to a test image), the testing module 222 presents (e.g., displays) the pass/fail determinations on the display 212.

Figure 3:
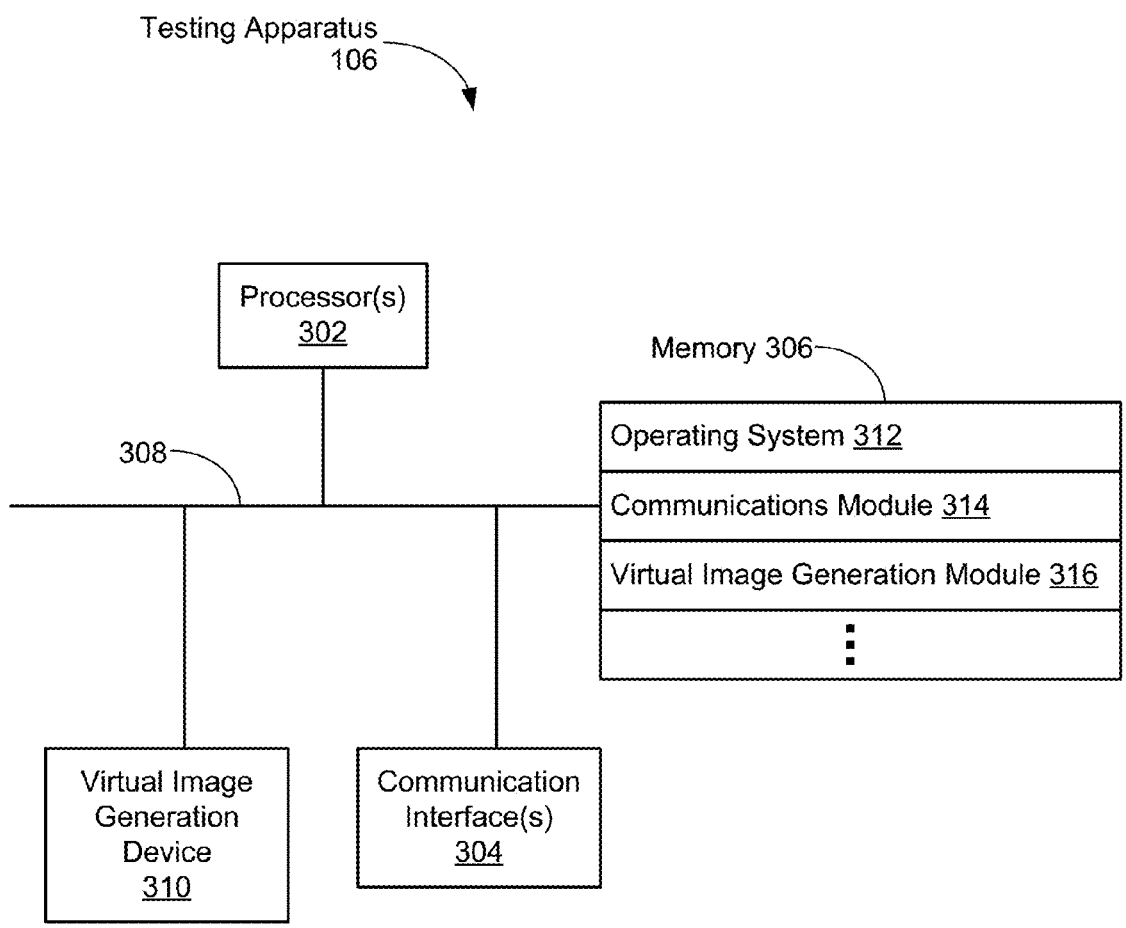
FIG. 3 is a block diagram illustrating an exemplary testing apparatus in accordance with some embodiments.

FIG. 3 is a block diagram illustrating an exemplary testing apparatus 106 in accordance with some embodiments. The testing apparatus 106 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The testing apparatus 106 includes a virtual image generation device 310. In some embodiments, the virtual image generation device 310 includes a light field device (a device that creates light fields) and/or a microlens array.

Memory 306 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the processor(s) 302. Memory 306, or alternately the non-volatile memory device(s) within memory 306, includes a non-transitory computer readable storage medium. In some embodiments, memory 306 or the computer readable storage medium of memory 306 stores the following programs, modules and data structures, or a subset or superset thereof:

- an operating system 312 that includes procedures for handling various basic system services and for performing hardware dependent tasks;
- a network communication module 314 that is used for connecting the testing apparatus 106 to other computers (e.g., the testing computer system 108) or devices (e.g., the image capture device under test) via the one or more communication network interfaces 304 (wired or wireless) and optionally one or more communication networks, such as USB, Wi-Fi, Bluetooth, the Internet, cellular telephone networks, mobile data networks, other wide area networks, local area networks, metropolitan area networks, and so on;
- a virtual image generation module 316 for generating test images using the virtual image generation device 310 in accordance with control signals from the testing computer system 108.

Figure 4:
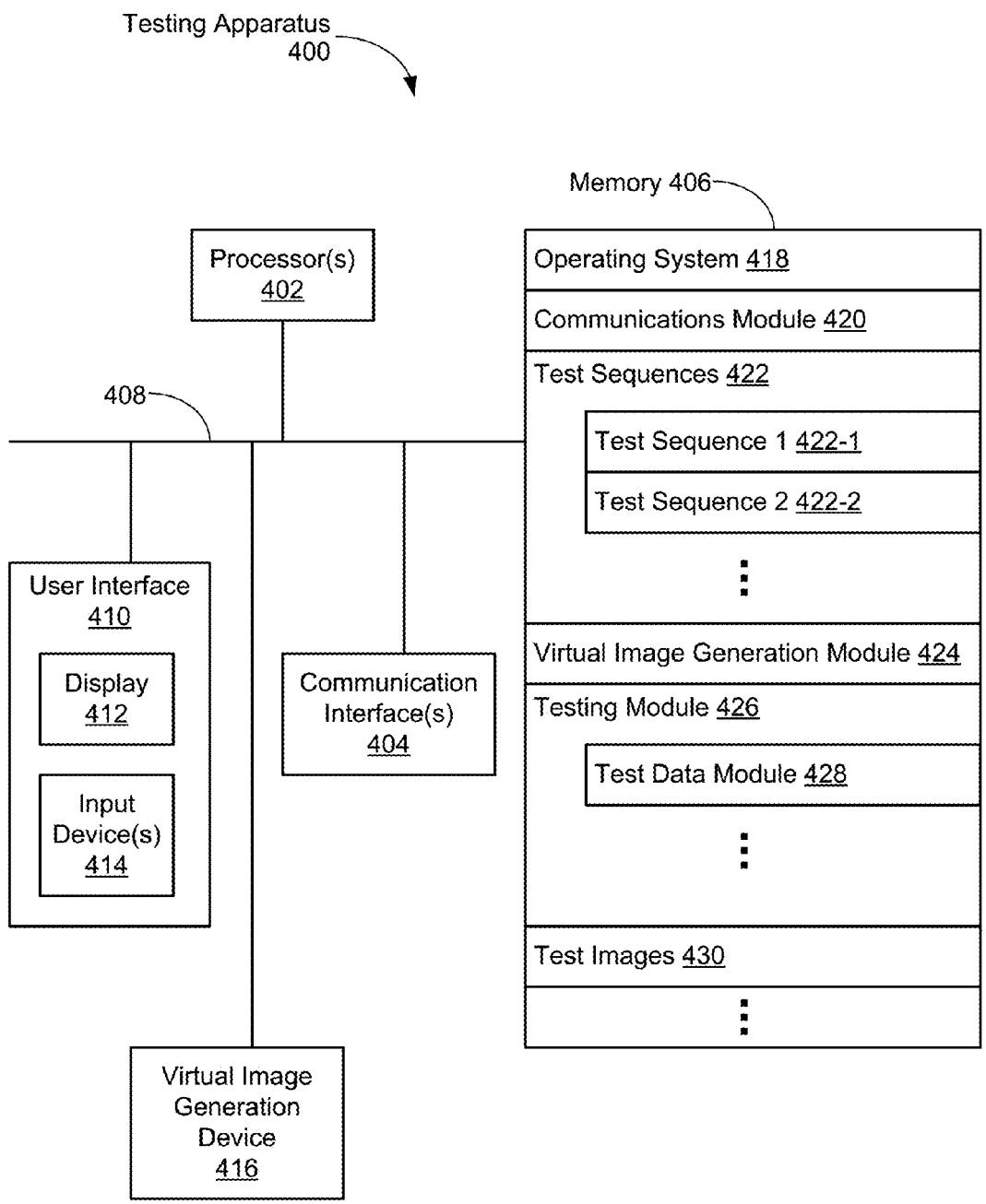
FIG. 4 is a block diagram illustrating an exemplary testing apparatus in accordance with some embodiments.

FIG. 4 is a block diagram illustrating an exemplary testing apparatus 400 in accordance with some embodiments. The testing apparatus 400 is an apparatus that includes the modules and components of the testing computer system 108 and the testing apparatus 106; the testing apparatus 400 integrates the testing apparatus 106 and the testing computer system 108, and their functionality, into one apparatus. In some embodiments, the testing apparatus 400 is part of the testing system 104. The testing apparatus 400 typically includes one or more processing units (processors or cores) 402 (analogous to processor(s) 202 or 302), one or more network or other communications interfaces 404 (analogous to communication interfaces 204 or 304), memory 406 (analogous to memory 206 or 306), and one or more communication buses 408 (analogous to bus 208 or 308) for interconnecting these components. The communication buses 408 optionally include circuitry (sometimes called a chipset) that interconnects and controls communications between system components. The testing apparatus 400 includes a user interface 410 (analogous to user interface 210). The user interface 410 includes a display device 412 (analogous to display device 212) and one or more input devices 414 (analogous to input devices 214), such as a keyboard, mouse, trackpad, and/or input buttons. Alternatively or in addition, the display device 412 includes a touch-sensitive surface, in which case the display is a touch-sensitive display. The testing apparatus 400 includes a virtual image generation device 416 (analogous to the virtual image generation device 310). In some embodiments, the virtual image generation device 416 includes a light field device (a device that creates light fields) and/or a microlens array.

Memory 406 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the processor(s) 404. Memory 406, or alternately the non-volatile memory device(s) within memory 406, includes a non-transitory computer readable storage medium. In some embodiments, memory 406 or the computer readable storage medium of memory 406 stores the following programs, modules and data structures, or a subset or superset thereof:

- an operating system 418 (analogous to operation system 216 or 312) that includes procedures for handling various basic system services and for performing hardware dependent tasks;
- a network communication module 420 (analogous to communication module 218 or 314) that is used for connecting the testing apparatus 400 to other computers or devices (e.g., the image capture device under test) via the one or more communication network interfaces 404 (wired or wireless) and optionally one or more communication networks, such as USB, Wi-Fi, Bluetooth, the Internet, cellular telephone networks, mobile data networks, other wide area networks, local area networks, metropolitan area networks, and so on;
- one or more test sequences 422 (analogous to test sequences 220);
- a virtual image generation module 424 (analogous to virtual image generation module 316) for generating test images using the virtual image generation device 416;
- a testing module 426 (analogous to testing module 222) for performing various operations related to the testing of image capture devices, which includes:
  - a test data module 428 (analogous to test data module 224) for analyzing images captured by the image capture devices under test and generating test data based on the analysis; and
- test images 430 (analogous to test images 226), which stores data corresponding to the possible test images that may be used for testing.

As the components of the testing apparatus 400 are analogous to components of the testing apparatus 106 or testing computer system 108 illustrated in FIGS. 2-3 and described above, and the testing apparatus 400 has the functionality of the testing apparatus 106 and the testing computer system 108, further details regarding the testing apparatus 400 and its components are omitted here for sake of brevity.

Figure 5:
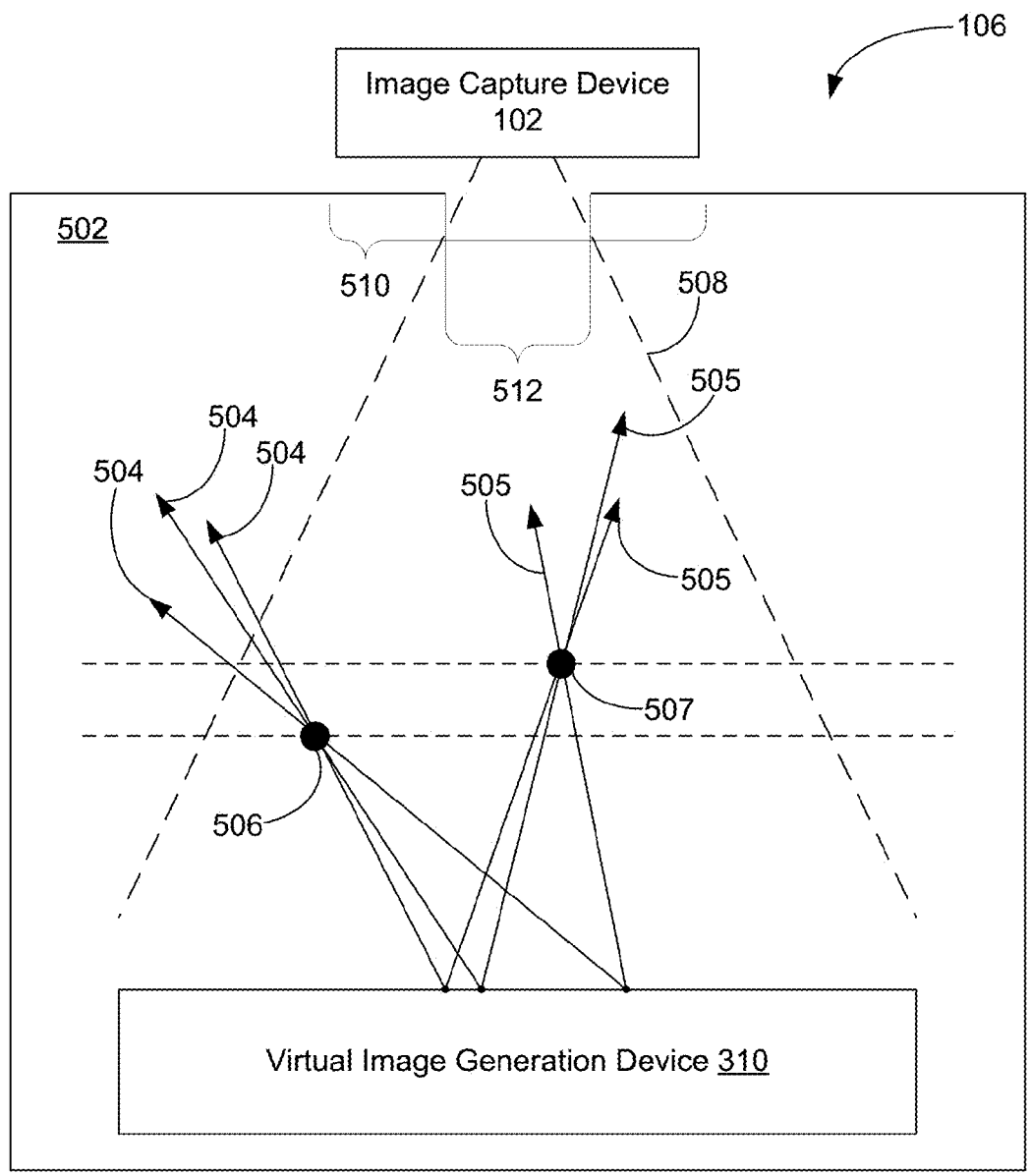
FIG. 5 is a diagram illustrating an exemplary testing apparatus in accordance with some embodiments.
Figure 6:
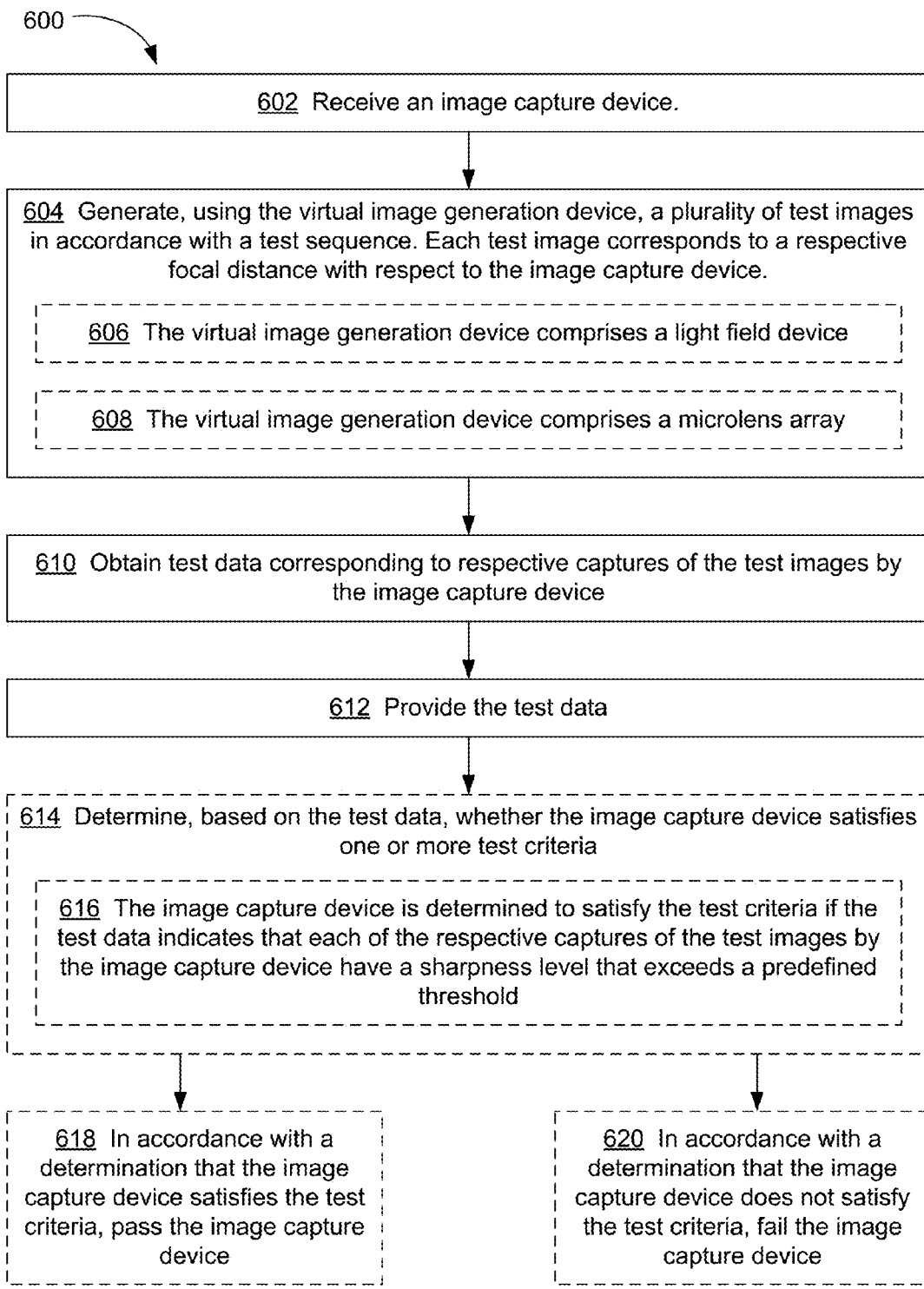
FIG. 6 is a flow diagram illustrating a method of testing an image capture device in accordance with some embodiments.

FIG. 5 illustrates an exemplary testing apparatus in accordance with some embodiments. FIG. 5 illustrates a simplified cross-sectional interior view of the testing apparatus 106 (or 400). The testing apparatus 106/400 includes a light booth 502 with a receptacle 510 for an image capture device 102 to be tested. The receptacle 510 is configured to enable the image capture device to perceive or detect test images generated within the light booth 502. For example, the receptacle 510 includes an opening 512 for the field of view 508 of the image capture device 102 to be directed (e.g., by aiming the lens) toward the interior of the light booth 502. The receptacle may simply be a designated surface or a designated area on a surface on which to place the image capture device 102, or a tray, well, or other platform or area designated and configured to receive the image capture device 102 in place during testing. In some other embodiments, the opening 512 is not part of the receptacle 510, but is nevertheless proximate to the receptacle 510.

The virtual image generation device 310 (or 416) is positioned within the light booth 502. The virtual image generation device 310/416 projects light rays 504 and 505 (e.g., as respective light fields) toward the field of view 508 of the image capture device 102 sitting at the receptacle 510. The light rays 504 and 505 are projected such that they respectively converge at a respective focal plane and are thus perceived as respective images by the image capture device 102. For example, light rays 504 are shown as converging at a point 506, and the light rays 504 converging at point 506 are perceived by the image capture device 102 as an image (e.g., a test image) at the focal plane corresponding to the point 506. Light rays 505 are shown as converging at a point 507, and the light rays 505 converging at point 507 are perceived by the image capture device 102 as an image (e.g., another test image) at the focal plane corresponding to the point 507. The image capture device 102 captures these images; the light rays 504 and 505 converging at points 506 and 507, respectively, form respective virtual images that are respective test images. In some embodiments, the virtual images at points 506 and 507 are perceived by the image capture device 102 in accordance with the auto-focus capabilities of the image capture device 102. A virtual image generated by the virtual image generation device 310/416 corresponds to a respective focal distance. For example, the virtual image simulates an image at the respective focal distance; the image capture device 102, if working properly, perceives the virtual image as if perceiving an image at the respective focal distance.

It should be appreciated that while FIG. 5 shows light rays 504 and 505 concurrently, in actual operation of the virtual image generation device 310, light rays 504 and 505 may be projected separately; light rays 504 may be projected to a first test image to the image capture device 102, and then light rays 505 may be projected to show a second test image to the image capture device 102, or vice versa.

An example of a test that may be performed on an image capture device 102 using the testing apparatus 106/400 is a sharpness or resolution test. The image capture device 102 is placed at the receptacle 510, with its field of view directed into the light booth 502. The virtual image generation device 310/416 shows test images at various focal distances to the image capture device 102. For example, the virtual image generation device 310/416 projects light rays 504 that converge at point 506 to show a first test image to the image capture device 102, and the image capture device 102 captures that image. The virtual image generation device 310/416 may then project light rays 505 that converge at point 507 to show a second test image to the image capture device 102, and the image capture device 102 captures that image. Each captured image is compared to its corresponding original image with respect to sharpness and/or resolution to determine whether the image capture device 102 passes or fails with respect to sharpness/resolution, and thus whether the image capture device 102 is functioning within acceptable parameters with respect to sharpness/resolution.

FIG. 6 is a flow diagram illustrating a method of testing image capture devices using virtual images in a testing system (e.g., testing system 104) with a virtual image generation device in accordance with some embodiments. In some embodiments, FIG. 6 corresponds to instructions stored in a computer memory or computer readable storage medium (e.g., memory 206/306/406).

The testing system receives an image capture device (602). The testing apparatus 106/400, for example, receives an image capture device 102 in the receptacle 510. The image capture device 102 may be placed in or at the receptacle 510 by hand or by a mechanical device (e.g., a robotic arm).

The testing system generates, using the virtual image generation device, a plurality of test images in accordance with a test sequence. Each test image corresponds to a respective focal distance with respect to the image capture device (604). For example, the virtual image generation device 310/416 generates, in accordance with control signals from the testing module 222/426, test images 226/430 in accordance with a test sequence 220/422. Each of the generated test images respectively corresponds to a respective focal distance. For example, the virtual image generation device 310/416 may generate one or more images that correspond to a first focal distance, generate one or more images that correspond to a second focal distance, and so on.

In some embodiments, the virtual image generation device includes a light field device (606). The virtual image generation device 310/416 includes a light field device, which generates virtual images by generating light fields that the image capture device 102 detects or perceives or senses as an image.

In some embodiments, the virtual image generation device includes a microlens array (608). The virtual image generation device 310/416 includes a microlens array, which may be used to direct light rays toward the image capture device 102 so that the light rays are detected or perceived or sensed as an image.

The testing system obtains test data corresponding to respective captures of the test images by the image capture device (610). For example, the test data module 224/428 obtains the captures of the test images by the image capture device 102 under test and analyzes the images to generate the test data (e.g., values based on one or more metrics associated with images). In some other embodiments, the testing apparatus 106 receives the captures from the image capture device 102 and performs the analysis to generate the test data, and the testing computer system 108 receives the test data from the testing apparatus 106; the testing apparatus 106 provides the test data to the testing computer system 108. In some further embodiments, the testing apparatus 106 receives the captures from the image capture device 102 and provides (e.g., transmits) the captures to the testing computer system 108 for analysis.

The testing system provides the test data (612). For example, the testing module 222/426 displays on the display 212/412 test data generated by the test data module 224/428 from analysis of images captured by the image capture device 102 under test. In some other embodiments, the testing system 104 provides the test data to another device for presentation. For example, the testing computer system 108 transmits the test data to another device (e.g., a remotely located computer or device from which a user can operate the testing system 104) for presentation at the another device.

In some embodiments, the testing system determines, based on the test data, whether the image capture device satisfies one or more test criteria (614). For example, the test data module 224/428 evaluates the test data for the images captured by the image capture device 102 under test to determine if the test data satisfies one or more test criteria. The test criteria may include whether a particular value for a characteristic (e.g., sharpness, alignment) exceed a threshold and/or whether the difference between a particular value for a capture from the image capture device 102 and the corresponding value for the corresponding test image (e.g., the difference in sharpness between the capture form the image capture device 102 and the corresponding test image) exceeds a threshold.

In some embodiments, the image capture device is determined to satisfy the test criteria (i.e., the image capture device passes) if the test data indicates that each of the respective captures of the test images by the image capture device have a sharpness level that exceeds a predefined threshold. For example, the image capture device 102 is determined to have satisfied the test criteria if the test data shows that, for each of the test images in the test sequence, the sharpness of the corresponding capture from the image capture device 102 exceeds a sharpness threshold.

In some embodiments, the image capture device is determined to satisfy the test criteria (i.e., the image capture device passes) if the test data indicates that the image capture device satisfies at least a threshold subset (e.g., at least 75%) of the test criteria. For example, if there are ten criteria on which the image capture device is tested, a threshold for passing may be satisfying at least eight of the ten criteria. An image capture device that satisfies eight or more of the ten criteria passes, but one that satisfies less than eight of the ten criteria fails.

In some embodiments, the test criteria include one or more primary criteria and one or more secondary criteria. The primary criteria are must-satisfy criteria; the image capture device must satisfy all of the primary criteria to have the possibility of passing, and failure to satisfy any of the primary criteria results in the image capture device failing. The secondary criteria are may-satisfy criteria; the image capture device just needs to satisfy at least some threshold amount (e.g., 25%, 50%, 75%) of the secondary criteria, as well as satisfying all of the primary criteria, in order to pass.

It should be appreciated that the test criteria described above are merely exemplary. Other test criteria in addition to, or in lieu of, sharpness criteria, are possible. For example, the test criteria may include whether the color accuracy exceeds a threshold, or the alignment is off by less than a threshold. Further, the image capture device may be determined to pass or fail overall, on a per-test-image basis (e.g., pass with respect to a first test image and fail with respect to a second test image), on a per-characteristic basis (e.g., pass with respect to one characteristic or criterion and fail with respect to another characteristic or criterion), or on a per-test-image-per-characteristic basis (e.g., pass with respect to a first characteristic/criterion and fail with respect to a second characteristic/criterion for a first test image, and fail with respect to the first characteristic/criterion and pass with respect to the second characteristic/criterion for a second test image). Further, passage/failure on a per-test-image basis, on a per-characteristic basis, and/or on a per-test-image-per-characteristic basis may be used to determine passage/failure overall (e.g., passage overall if the image capture device passes for more than a threshold amount of the test images in the test sequence, otherwise failure overall).

In some embodiments, in accordance with a determination that the image capture device satisfies the test criteria, the testing system passes the image capture device (618). In some embodiments, in accordance with a determination that the image capture device does not satisfy the test criteria, the testing system fails the image capture device (620). If the image capture device satisfies the test criteria, the testing system determines that the image capture device passes the tests, and may present that determination to a user (e.g., display on display device 212/412). If the image capture device does not satisfy the test criteria, the testing system determines that the image capture device fails the tests, and may present that determination to a user (e.g., display on display device 212/412).

Figure 7A:
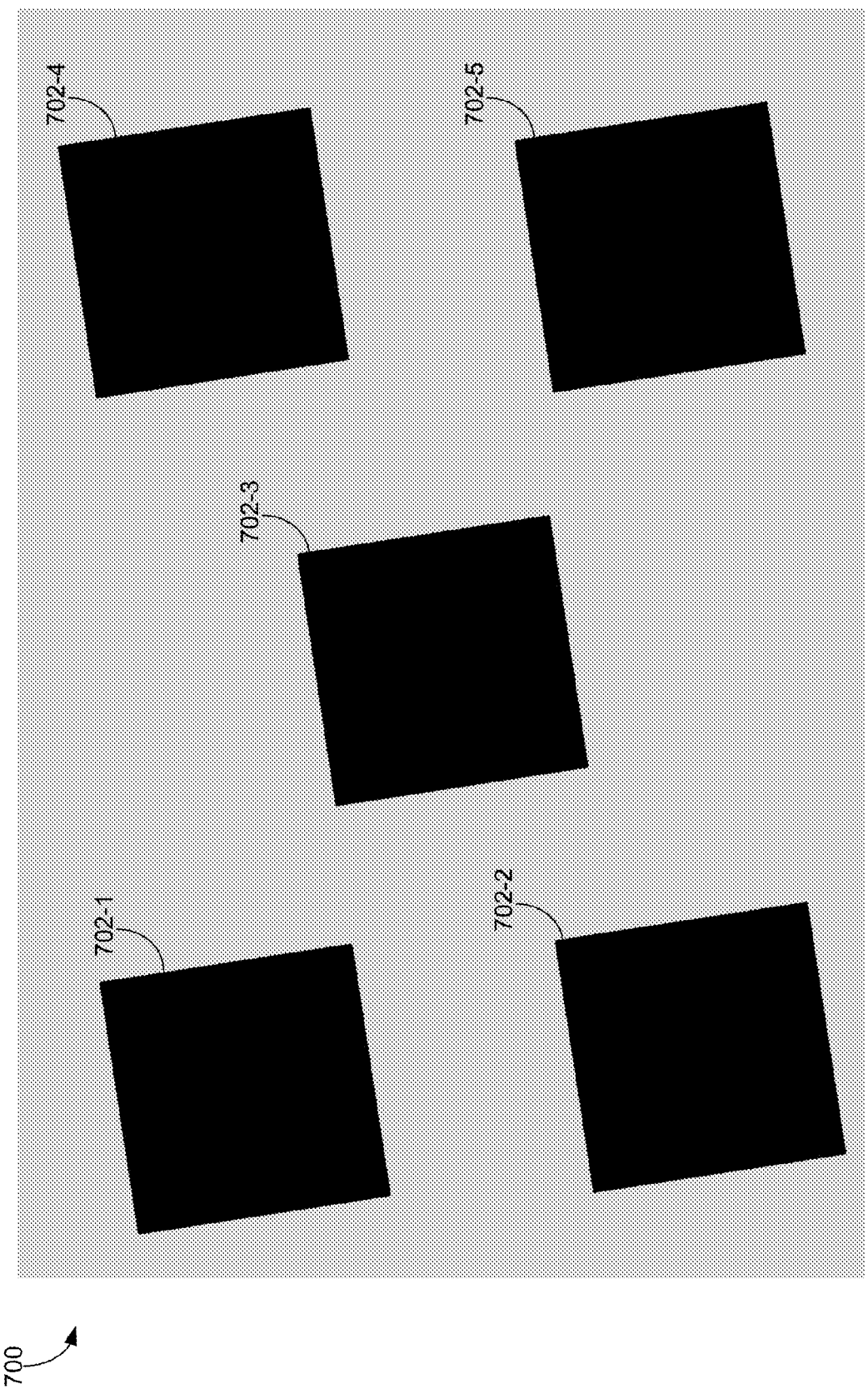
FIGS. 7A-7B illustrate example test images in accordance with some embodiments.
Figure 7B:
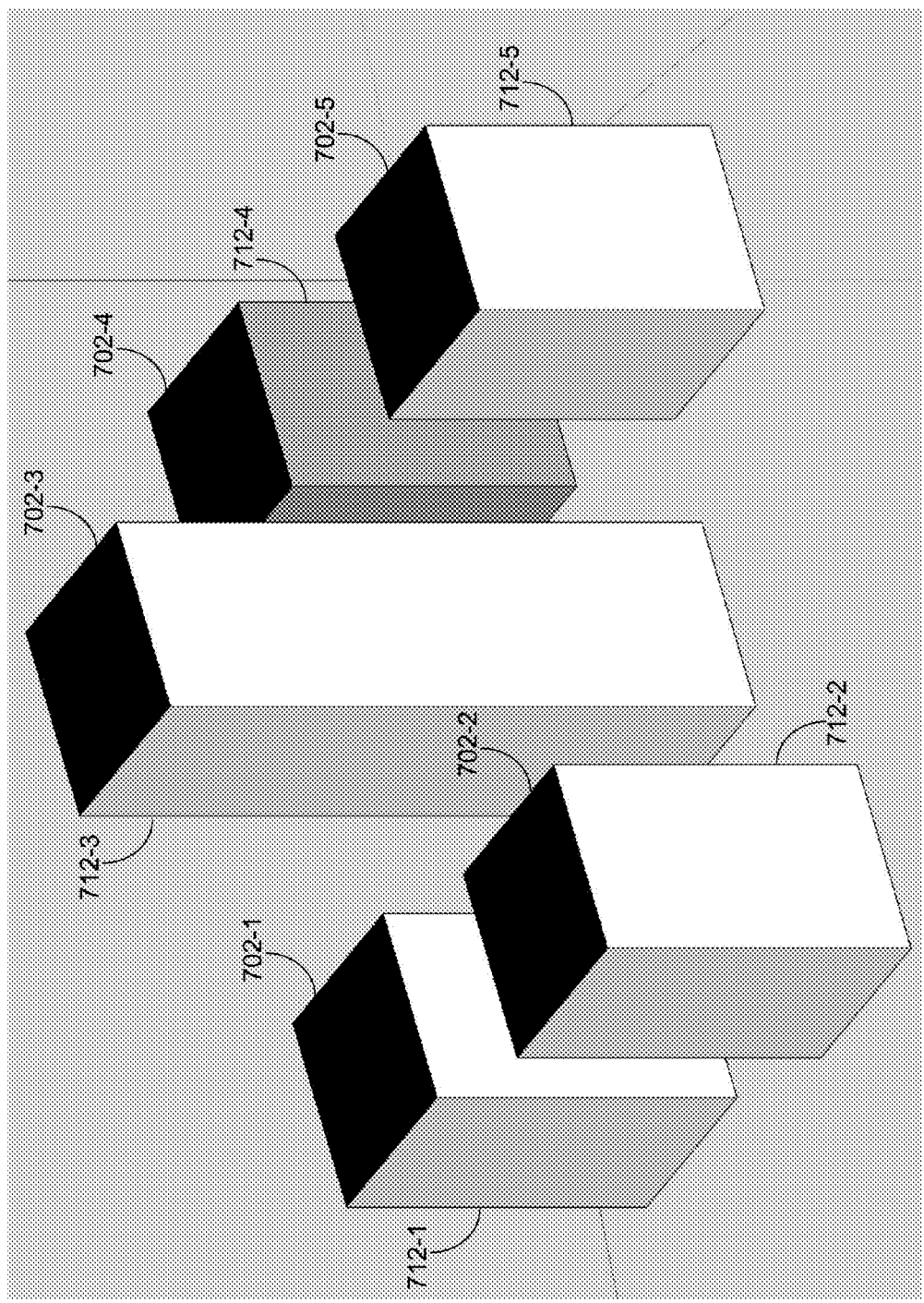

FIGS. 7A-7B illustrate example test images in accordance with some embodiments. FIG. 7A illustrates a top-down view 700 of the interior of a light booth (e.g., light booth 502) of a testing apparatus (e.g., testing apparatus 106/400). Top-down view 700 depicts the perspective of an image capture device 102 under test, placed at the receptacle (e.g., receptacle 510) of the light booth, with the field of view 508 of the image capture device 102 directed into the light booth. FIG. 7B illustrates an angled view 710 of the interior of the light booth. The angled view 710 depicts a view of the interior of the light booth from the perspective of an observer other than the image capture device 102 under test. The top-down view 700 shows test images 702-1 thru 702-5 concurrently projected by a virtual image generation device (not shown in FIGS. 7A-7B) (e.g., virtual image generation device 310/416). These images 702 are projected at respective projection distances from the virtual image generation device, with the corresponding respective distances from the image capture device 102 to the respective test images 702 being the respective focal distances. In FIG. 7B, columns 712-1 thru 712-5 represent the projection distances of the test images 702-1 thru 702-5, respectively, from the virtual image generation device to each of the test images.

It should be appreciated that the columns 712 are shown in FIG. 7B merely as visualizations of the respective projection distances of the test images 702 from the virtual image generation device, in order to provide a representation of the different focus distances of the test images 702 to the image capture device. In actual implementations, columns 712 are not part of the actual test images 702.

Additionally, the test images 702 are depicted in FIG. 7A without blur for sake of convenience and simplicity of illustration. In actual implementations, the resolutions of the test images 702 from the perspective of the image capture device 102 will differ due to their different focus distances. In other words, while as illustrated in FIG. 7A the test images 702 appear to be equally clear, in actual implementations, from the perspective of the image capture device 102, some of the images 702 will be clear or otherwise more in focus and others of the images 702 will be blurry or otherwise less in focus due to their different focus distances.

During a test sequence, the image capture device 102 perceives the projected test images 702 and captures the test images 702 in accordance with its capabilities. For example, the image capture device 102 attempts to focus on the test image 702-1. With the image capture device 102 focused the test image 702-1 (and the rest of the test images 702-2 thru 702-5 out of focus due to the different focus distances), the image capture device 102 makes an image capture. The image capture device 102 may then repeat this with focus on the other test images 702-2 thru 702-5, respectively. The captures are analyzed by the test data module 224/428, and one or more aspects or characteristics of the image capture device 102 (e.g., focusing capabilities, sharpness, resolution) are judged based on the analysis.

As shown in FIGS. 7A-7B, test images 702-1 thru 702-5 are projected concurrently as part of the test sequence. In some embodiments, the test sequence includes test images 702-1 thru 702-5 projected one at a time, as opposed to concurrently, and at the same positions as or different positions than shown.

While the description above assumes that the test images and the captures by the image capture device under test are still images, it should be appreciated that the embodiments described above may be used to test video capture.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An apparatus, comprising:
 a virtual image generation device;
 a receptacle for a digital camera; and
 a light booth;
 wherein the virtual image generation device is located opposite to the receptacle for a digital camera within the light booth and is configured to generate a plurality of test images within the light booth by projecting light rays that converge at respective focal planes in the light booth between the receptacle and the virtual image generation device, in accordance with a test sequence; and
 wherein the receptacle is configured to enable detection of the test images by the digital camera.

2. The apparatus of claim 1, wherein the virtual image generation device comprises a light field display.

3. The apparatus of claim 1, wherein the virtual image generation device comprises a microlens array.

4. The apparatus of claim 1, wherein each test image of the plurality of test images corresponds to a respective focal distance with respect to the digital camera.

5. The apparatus of claim 1, wherein the virtual image generation device is configured to:
 project light rays to show a first test image to be captured by the image capture device; and
 project light rays to show a second test image to be captured by the image capture device.

* * * * *